F. M. SLATER.
EXHAUST CONTROLLING VALVE FOR PERCUSSIVE TOOLS.
APPLICATION FILED JUNE 1, 1914.
1,236,614.
Patented Aug. 14, 1917.
2 SHEETS—SHEET 1.
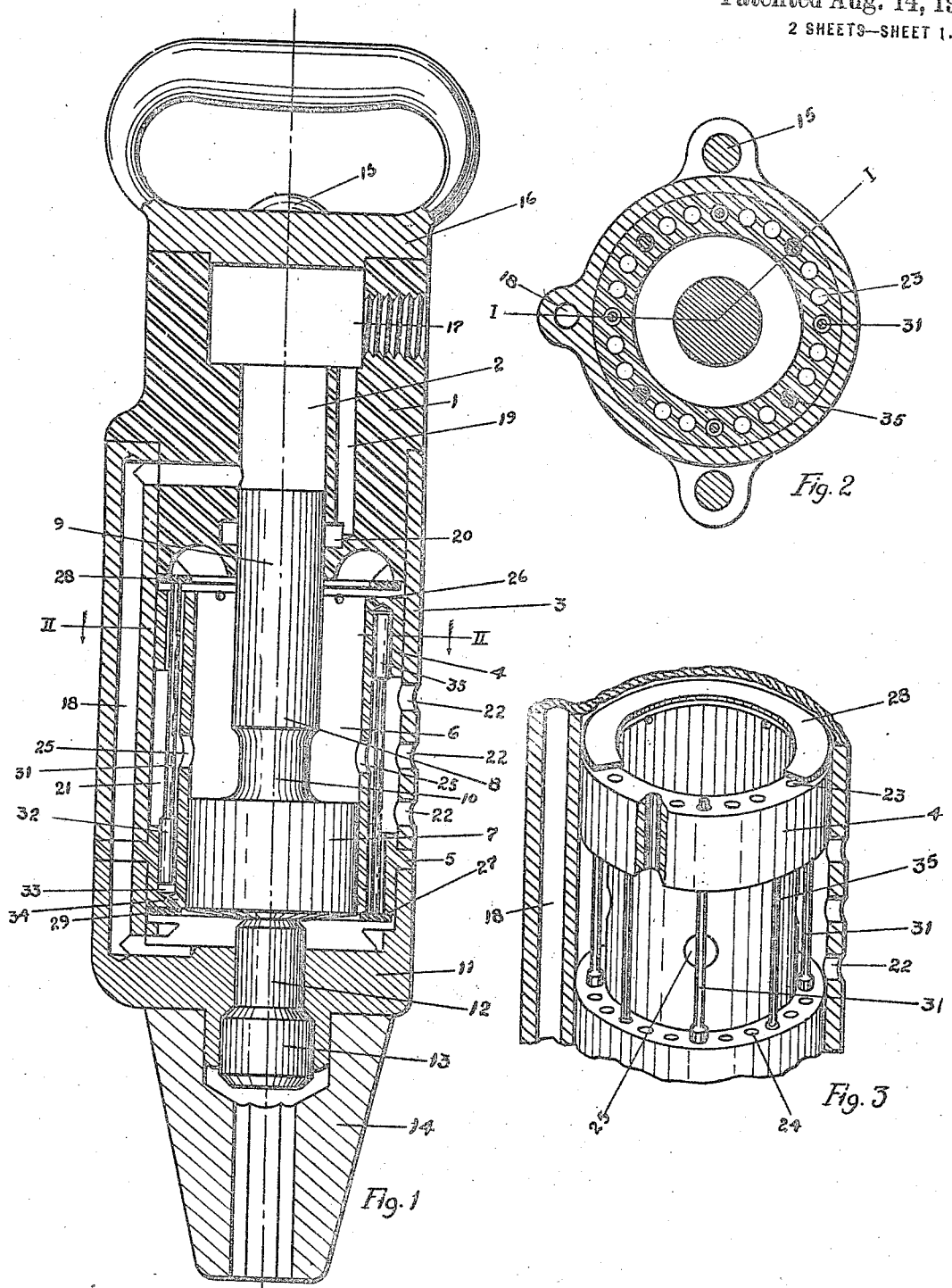
WITNESSES:
L. C. Bayles
Russell H. Wilhelm
INVENTOR
F. M. Slater
BY
Rudolph Burwell Goode
ATTORNEY

UNITED STATES PATENT OFFICE.

FRED M. SLATER, OF EASTON, PENNSYLVANIA, ASSIGNOR TO INGERSOLL-RAND COMPANY, OF JERSEY CITY, NEW JERSEY, A CORPORATION OF NEW JERSEY.

EXHAUST-CONTROLLING VALVE FOR PERCUSSIVE TOOLS.

1,236,614.     Specification of Letters Patent.     Patented Aug. 14, 1917.

Application filed June 1, 1914. Serial No. 842,235.

*To all whom it may concern:*

Be it known that I, FRED M. SLATER, a citizen of the United States, residing at Easton, in the county of Northampton and State of Pennsylvania, have invented a certain new and useful Improvement in Exhaust-Controlling Valves for Percussive Tools, of which the following is a specification.

This invention relates to fluid operated percussive tools, and more particularly to valve mechanism for controlling the exhaust from such tools.

The object of the invention is to provide a separate valve for controlling the exhaust from one or both ends of the cylinder independently of the admission of fluid to the cylinder.

Figure 5:
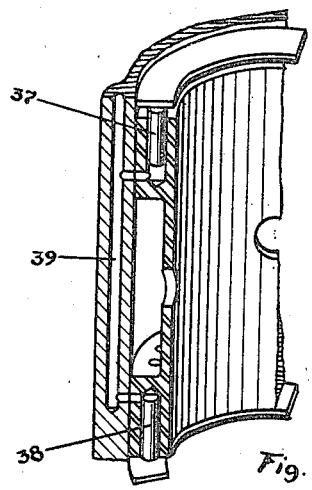
Figure 4:
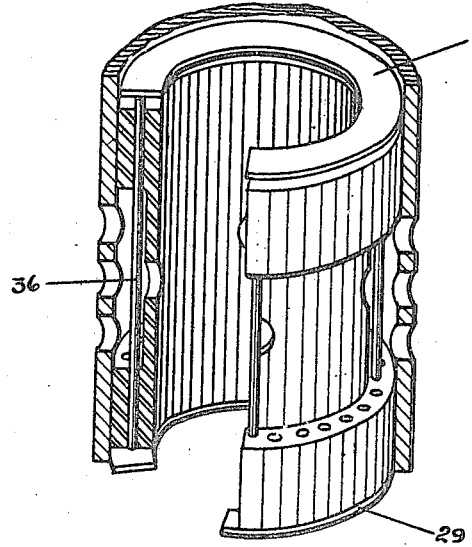
Figure 6:
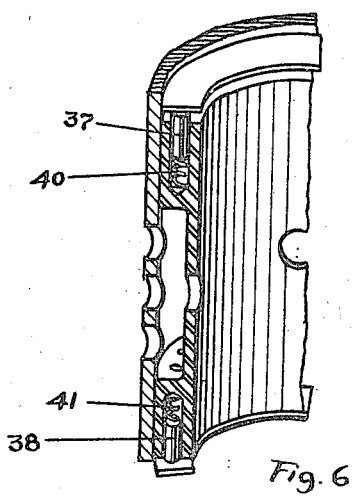

This object is accomplished by the invention, practical embodiments of which are shown in the accompanying drawings, in which, Figure 1 shows a longitudinal section through the complete tool taken on the line 1—1 of Fig. 2, Fig. 2 shows a transverse section taken on the line 2—2 of Fig. 1, Fig. 3 shows a view with the cylinder partly broken away showing one of the valves and its operating rods in perspective, while Figs. 4, 5 and 6 are views similar to Fig. 3 of modified forms of the valve mechanism.

In the drawings, the tool is shown as comprising a cylinder made up of two parts, a rearward part 1 which is provided with a bore 2 of comparatively small diameter, and a forward part 3 which has a bore of considerably larger diameter. Sliding into the bore of the cylinder portion 3 is a lining sleeve 4 which has a flange 5 near its forward end which engages the forward end of the cylinder portion 3 and serves to position the sleeve 4 in the cylinder.

The bore of the sleeve 4 provides a forward cylinder space 6 which is of considerably larger diameter than the rearward bore 2 and sliding in the bore 6 is the head 7 of the piston 8 from which extends rearwardly a shank portion 9 which slides in the bore 2, there being a neck 10 between the head 7 and the shank 9.

Seating against the flange 5 is a front head 11 through which the shank 12 of an anvil block 13 projects into the path of the piston.

The parts are all held together by a nose piece 14 which is secured by bolts 15 to the back head 16 by means of lugs, (not shown).

During the operation of the tool air is admitted constantly through a passage 17 in the rear end of the bore 2. From an intermediate point in this bore 2, so placed as to be uncovered by the piston near the end of its forward stroke, a passage 18 leads to the extreme forward end of the cylinder, while from the constant pressure part of the cylinder a passage 19 leads to an annular port 20 near the forward end of the bore 2 so placed as to be thrown into communication with the rear end of the bore in sleeve 4 by means of the neck 10 of the piston near the end of its rearward stroke.

In the outer surface of the sleeve 4 there is a depression which when the sleeve is in position in the cylinder forms an annular exhaust chamber 21 of considerable length which communicates with the atmosphere through ports 22 in the cylinder 3 and with the opposite ends of the bore in cylinder 3 by two series of longitudinal passages 23 and 24. The exhaust chamber 21 is also in communication with the cylinder by means of auxiliary exhaust ports 25 placed centrally of the cylinder and adapted to be uncovered by the piston head near the end of its stroke in either direction. The ends of the sleeve 4 are squared off to form transverse annular valve seats 26 and 27, to the surfaces of which open respectively the passages 23 and 24.

Seated on the valve seats 26 and 27 are valves 28 and 29, here shown as annular plates, which have a limited movement off the seats to open the exhaust passages 23 and 24 from the cylinder and close in the manner of check valves. To open these exhaust valves several mechanisms are shown. In Fig. 1 there is provided a series of rods 31 the upper ends of these rods being of small diameter and sliding through the passages 23 into contact with the valve 28 while their lower ends are provided with larger heads 32 fitting into small cylinders 33 to which fluid is admitted from the forward end of the cylinder by passages 34. Similar rods 35 operating in a reverse direction are provided for the valve 29.

The operation of this form is as follows: When the piston is in its rearmost position air will be admitted to the rear end of the bore 2 and to the rear end of the bore 6 through the passage 19, past the neck 10. At the same time the pressure on the valve 28 will hold it to its seat, closing the passages 23, while the pressure on the upper ends of rods 35 will hold them in forward position so that the valve 27 will be forced from its seat and allow the fluid to escape from the forward end of the cylinder. As the piston moves downwardly driven by the pressure on its rear surfaces the air will first be cut off from the rear end of the bore 6 by the covering of the port 20 by the shank 9. The rear end of the bore 6 will be exhausted when the rear face of the piston head passes the ports 25. When the rear face of the shank has passed the opening of the passage 18 as shown in Fig. 1, fluid will be admitted to the forward end of the bore 6 and drive the piston backward against the constant pressure on the shank 9. The escape of a slight amount of fluid past the valve 29 will carry this valve upwardly and close the ports 24, there being no pressure downwardly at this time from the rods 35 by reason of the fact that the fluid in the rear end of the bore 6 has been exhausted through the ports 25.

At the same time the live fluid in the forward end of the bore 6 passing through the passages 34 into the small cylinders 33 will raise the rods 31 and consequently the valve 28, opening the exhaust passages 23 and allowing the air from the rear end of the bore 6 to escape to atmosphere.

After the rear face of the shank 9 has again covered the passage 18 on its rearward stroke the expansion of the fluid in the forward end of the bore 6 together with the recoil from the blow on the drill or other tool will carry the piston rearwardly. As it nears the end of its rearward stroke the forward end of the piston head will uncover the exhaust ports 25 allowing the pressure to escape from the small cylinder 33, thus removing the upward pressure on the valve 28 and enabling it to close. When the neck 10 uncovers the port 20, pressure will be again admitted to the rear end of the bore 6, closing the valve 28 and moving the rod 35 downwardly to open the valve 29, the cycle of operations above described being again repeated.

In Fig. 4 another modification of the valve mechanism is shown. In this form rods 36 are provided which are of slightly greater length than the distance between the valve seats, these rods passing clear through some of the passages 23 and 24 and having their ends in contact with both valves 28 and 29. It will be seen that with this construction the closing movement of one valve accomplishes the opening movement of the other. This form of valve mechanism is particularly adapted where it is desired to control the exhaust of both ends of a cylinder chamber and evidently cannot be used for controlling only one end as could the forms shown in Figs. 1 to 3.

In Fig. 5 a further modified form is shown in which the valves are moved by small pistons 37 and 38 to the inner ends of which fluid pressure is constantly supplied by means of a passage 39 leading to the inlet of the tool.

In Fig. 6 a form similar to that shown in Fig. 5 is shown in which the pistons 37 and 38 are pressed outwardly with a constant pressure by means of springs 40 and 41.

In these last two forms the valves are closed when live pressure is admitted to the respective ends of the bore 6 and open immediately this pressure is relieved.

Although the invention is here shown in connection with a tool in which the admission of fluid to the intermittently supplied parts of the cylinder is controlled by the movement of the piston as in the so-called "valveless" types of tools, it is evident that the exhaust valves of this invention could be used equally well in a tool in which the admission to the cylinder is controlled by a separate inlet valve.

Furthermore, although exhaust valves are shown provided for both ends of the cylinder it is evident that with the valves shown in Figs. 1 to 3, 5 and 6, the exhaust from only one end of the cylinder could be controlled, the other exhaust valve being omitted, and it is to be understood that the above showing and description discloses only certain specified modifications of the invention, and other forms and modifications of the invention are included in the spirit and scope of the same as expressed in the claims.

What I claim is:

1. In a fluid operated percussive tool, a cylinder, a piston, passages controlled by the piston for alternately admitting fluid to opposite ends of the cylinder, an annular valve seat in each intermittently supplied end of the cylinder, exhaust ports leading therefrom to the atmosphere, annular plate valves on said valve seats, and means for raising said valves from their seats comprising spacing rods between said valves.

2. In a fluid operated percussive tool, a cylinder of two diameters, a piston of two diameters therein, means for supplying fluid constantly to the smaller diameter portion of the cylinder, passages controlled by the piston for admitting fluid alternately to the ends of the larger diameter portion of the cylinder, a sleeve in the larger diameter portion of the cylinder surrounding the larger diameter portion of the piston and having annular valve seats on its ends, exhaust ports leading from said valve seats to the atmosphere, plate valves on said valve seats controlling said exhaust ports, and means for opening said valves.

3. In a fluid operated percussive tool, a cylinder of two diameters, a piston of two diameters therein, means for supplying fluid constantly to the smaller diameter portion of the cylinder, passages controlled by the piston for admitting fluid alternately to the ends of the larger diameter portion of the cylinder, a sleeve in the larger diameter portion of the cylinder surrounding the larger diameter portion of the piston and having annular valve seats on its ends, exhaust ports leading from said valve seats to the atmosphere, plate valves on said valve seats controlling said exhaust ports, and means for opening said valves, said means comprising spacing rods of greater length than said sleeve, contacting with said valves.

4. In a fluid operated percussive tool, a cylinder, a piston, means for admitting pressure constantly to one end of said cylinder, a passage controlled by the movement of the piston for admitting fluid to the other end of the cylinder, an exhaust port for the last mentioned end of the cylinder, an annular plate valve controlling said exhaust port, and means for operating said valve.

5. In a fluid operated percussive tool, a cylinder, a piston, means for alternately admitting motive fluid to the opposite ends of the cylinder, an annular valve seat in each intermittently supplied end of the cylinder, exhaust ports leading from said annular valve seats to the atmosphere, annular plate valves on said valve seats and means for raising said valves from their seats.

6. In a fluid operated percussive tool, a cylinder, a piston, means for alternately admitting motive fluid to the opposite ends of the cylinder, an annular valve seat in each intermittently supplied end of the cylinder, exhaust ports leading from said annular valve seats to the atmosphere, annular plate valves on said valve seats and means for alternately raising said valves from their seats, comprising spacing members holding the valves farther apart than the distance between the valve seats.

7. In a fluid operated percussive tool, a cylinder, a piston, passages controlled by the piston for alternately admitting fluid to opposite ends of the cylinder, an annular valve seat in each intermittently supplied end of the cylinder, exhaust ports leading from said annular valve seats to the atmosphere, annular plate valves on said valve seats, and means for alternately raising said valves from their seats.

8. In a fluid operated percussive tool, a cylinder, a piston, passages controlled by the piston for alternately admitting motive fluid to the opposite ends of the cylinder, an annular valve seat in each intermittently supplied end of the cylinder, exhaust ports leading from said annular valve seats to the atmosphere, annular plate valves on said annular valve seats, and means for alternately raising said valves from their seats comprising spacing members holding the valves farther apart than the distance between the valve seats.

In testimony whereof, I have hereunto set my hand.

FRED M. SLATER.

Witnesses:
L. C. BAYLES,
ARTHUR SMITH.